US008848053B2

(12) United States Patent  (10) Patent No.: US 8,848,053 B2
Scanlon et al.  (45) Date of Patent: Sep. 30, 2014

(54) AUTOMATIC EXTRACTION OF SECONDARY VIDEO STREAMS

(75) Inventors: W. Andrew Scanlon, Falls Church, VA (US); Andrew J. Chosak, Arlington, VA (US); John I. W. Clark, Flamborough (CA); Robert A. Cutting, Ashburn, VA (US); Alan J. Lipton, Austin, TX (US); Gary W. Myers, Aldie, VA (US)

(73) Assignee: ObjectVideo, Inc., Reston, VA (US)

( * ) Notice: Subject to any disclaimer, the term of this patent is extended or adjusted under 35 U.S.C. 154(b) by 1064 days.

(21) Appl. No.: 12/294,761

(22) PCT Filed: Mar. 27, 2007

(86) PCT No.: PCT/US2007/007518
§ 371 (c)(1),
(2), (4) Date: Sep. 26, 2008

(87) PCT Pub. No.: WO2007/126780
PCT Pub. Date: Nov. 8, 2007

(65) Prior Publication Data
US 2010/0165112 A1  Jul. 1, 2010

Related U.S. Application Data

(63) Continuation-in-part of application No. 11/390,498, filed on Mar. 28, 2006, now abandoned.

(51) Int. Cl.
*H04N 7/18*  (2006.01)
*G06K 9/00*  (2006.01)
*H04N 19/17*  (2014.01)
*H04N 19/20*  (2014.01)

(52) U.S. Cl.
CPC ........ *H04N 7/26638* (2013.01); *G06K 9/00771* (2013.01); *H04N 7/26276* (2013.01)
USPC .......................................... 348/143; 348/169

(58) Field of Classification Search
USPC ................................................... 348/143, 169
See application file for complete search history.

(56) References Cited

U.S. PATENT DOCUMENTS

| | | | |
|---|---|---|---|
| 6,295,367 B1 | 9/2001 | Crabtree et al. | |
| 6,335,985 B1 | 1/2002 | Sambonsugi et al. | |
| 6,529,550 B2 | 3/2003 | Tahara et al. | |
| 6,989,868 B2 | 1/2006 | Masukura et al. | |
| 7,551,203 B2 * | 6/2009 | Nakayama et al. | 348/222.1 |
| 7,555,203 B2 * | 6/2009 | Takakuwa et al. | 386/248 |
| RE42,690 E * | 9/2011 | Aviv | 348/152 |

(Continued)

OTHER PUBLICATIONS

Takao Yokoi et al., "Automatic Lecture Video Generation from High Resolution Images Based on Broadcasting Cameraman's Technique," Sep. 2005.

(Continued)

*Primary Examiner* — Emmanuel L Moise
*Assistant Examiner* — Marie Georges Henry
(74) *Attorney, Agent, or Firm* — Muir Patent Consulting, PLLC

(57) ABSTRACT

The automatic generation (702) of one or more secondary video streams based on an input primary video stream (701) may use analytics performed on the video to provide information on targets, events, and/or areas of interest to permit the one or more secondary video streams (703) to concentrate on one or more targets, events, and/or areas of interest.

71 Claims, 8 Drawing Sheets

(56) References Cited

U.S. PATENT DOCUMENTS

2003/0048926 A1    3/2003    Watanabe
2004/0151342 A1    8/2004    Venetianer et al.
2008/0056673 A1*   3/2008    Morris .......................... 386/95

OTHER PUBLICATIONS

Seiji Tohyama et al., "A Method for Estimating Depth of Foreground Object for View Synthesis Using Multiple Cameras," Sep. 2005.

Takao Yokoi et al., "Virtual Camerawork for Generating Lecture Video from High Resolution Images," IEEE Int'l Conf. on Multimedia and Expo (ICME 2005), Jul. 2005.

Takao Yokoi et al., "Automatic Lecture Video Generation from High Resolution Images," Jun. 2005.

Takao Yokoi et al., "Digital Archiving by Image Mosaicing for Lecture and Its Replay," Mar. 2004.

Seiji Toyama et al., "The Basic Examination of the Reproduction of Writing on a Blackboard with the Blackboard as the Subject Using Image Mosaicing," Oct. 2003.

* cited by examiner

AUTOMATIC EXTRACTION OF SECONDARY VIDEO STREAMS

CROSS-REFERENCE TO RELATED APPLICATIONS

This application is the national stage under 35 U.S.C. §371 of International Application No. PCT/US2007/007518 filed Mar. 27, 2007 which Continuation of and claims priority to U.S. patent application Ser. No. 11/390,498, filed Mar. 28, 2006, now abandoned.

FIELD OF THE INVENTION

The present invention is related to methods and systems for performing video-based surveillance. More specifically, the invention relates to a video surveillance and verification system that may be configured to extract virtual fields of view (VFOV) as a secondary video output stream from a video source.

BACKGROUND OF THE INVENTION

Many businesses and other facilities, such as banks, stores, airports, etc., make use of security systems. Among such systems are video-based systems, in which a sensing device, like a video camera, obtains and records images within its sensory field. For example, a video camera will provide a video record of whatever is within the field-of-view of its lens. Such video images may be monitored by a human operator and/or reviewed later by a human operator. Recent progress has allowed such video images to be monitored also by an automated system, improving detection rates and saving human labor.

One common issue facing designers of such security systems is the tradeoff between the area of coverage for a particular sensor and the actual effectiveness of said sensor. Take, for example, a security system utilizing video cameras to monitor a single level of a parking structure. On one extreme, a limited number of wide-angle cameras may be placed strategically around the structure to provide complete coverage of the area. This is a simple and cost-effective means to monitor a large area of interest. However, the drawback is potentially poor video resolution and an inadequate level of detail when observing activities in the scene. On the other extreme, a large number of narrow-angle cameras may be used to provide a greater level of detail of activities within the scene. The drawbacks to this solution are a greater operating cost to install and maintain the increased number of video cameras as well as an increased complexity for manual operators to maintain situational awareness over the entire scene.

SUMMARY OF THE INVENTION

Embodiments of the present invention are directed to an apparatus and a method to address the problems described above. Such embodiments address a way of automatically extracting virtual narrow-angle views from a wide-angle video stream, thus allowing fewer cameras to monitor large areas while still providing detailed imagery of targets or events of interest.

According to one embodiment, the invention may comprise a method of processing image data from a primary video stream to detect targets or events of interest and extracting one or more secondary video streams from the primary video stream that provide enhanced image data detailing the targets or events of interest detected.

According to another embodiment, the invention may comprise a method of processing image data from a secondary video stream which has been extracted from a primary video stream, detecting targets or events of interest as a result of said processing, and adjusting the extraction of the secondary video stream from the primary video stream so that the secondary video stream provides enhanced image data detailing the detected targets or events of interest.

According to a particular embodiment, a method of automatically generating at least one secondary video stream based on an incoming primary video stream may comprise performing video analytics on the primary video stream to generate one or more analysis results, the one or more analysis results including information relating to at least one element selected from the group consisting of a target, an event, and an area of interest; and automatically extracting at least one secondary video stream from the primary video stream based on the one or more analysis results, wherein a field of view of the secondary video stream is smaller than or equal to a field of view of the primary video stream.

According to another particular embodiment, a method of automatically generating at least one secondary video stream based on an incoming primary video stream may comprise performing first video analytics on the primary video stream to generate one or more first analysis results, the one or more first analysis results including information relating to at least one element selected from the group consisting of a target, an event, and an area of interest; automatically extracting at least one secondary video stream from the primary video stream based on the one or more first analysis results, wherein a field of view of the secondary video stream is smaller than or equal to a field of view of the primary video stream; performing second video analytics on said at least one secondary video stream to provide one or more second analysis results; and feeding back said one or more second analysis results such that said automatically extracting at least one secondary video stream is further based on said one or more second analysis results.

In yet another particular embodiment, a method of automatically generating at least one secondary video stream based on an incoming primary video stream may comprise automatically extracting at least one secondary video stream from the primary video stream, wherein a field of view of the secondary video stream is smaller than or equal to a field of view of the primary video stream; performing video analytics on said at least one secondary video stream to provide one or more analysis results; and feeding back said one or more analysis results such that said automatically extracting at least one secondary video stream is based at least in part on said one or more second analysis results.

All of the above embodiments may be implemented in multiple forms, e.g., as an apparatus, as a method, as hardware, as firmware, and as software on a computer-readable medium. Regarding the latter, the invention may be embodied in the form of a computer system running such software. Furthermore, the invention may be embodied in the form of an embedded hardware device running such software.

DEFINITIONS

The following definitions are applicable throughout this disclosure, including in the above.

A "video" refers to motion pictures represented in analog and/or digital form. Examples of video include: television, movies, image sequences from a video camera or other observer, and computer-generated image sequences.

A "frame" refers to a particular image or other discrete unit within a video.

An "object" refers to an item of interest in a video. Examples of an object include: a person, a vehicle, an animal, and a physical subject.

A "target" refers to the computer's model of an object. The target is derived from the image processing, and there is a one-to-one correspondence between targets and objects.

A "best-shot" is the optimal frame or sequences of frames of a target for recognition purposes, by human or machine. The best-shot may be different for computer-based recognition systems and the human visual system.

An "activity" refers to one or more actions and/or one or more composites of actions of one or more objects. Examples of an activity include: entering; exiting; stopping; moving; raising; lowering; growing; shrinking; stealing; loitering; and leaving an object.

A "location" refers to a space where an activity may occur. A location can be, for example, scene-based or image-based. Examples of a scene-based location include: a public space; a store; a retail space; an office; a warehouse; a hotel room; a hotel lobby; a lobby of a building; a casino; a bus station; a train station; an airport; a port; a bus; a train; an airplane; and a ship. Examples of an image-based location include: a video image; a line in a video image; an area in a video image; a rectangular section of a video image; and a polygonal section of a video image.

An "event" refers to one or more objects engaged in an activity. The event may be referenced with respect to a location and/or a time.

A "computer" refers to any apparatus that is capable of accepting a structured input, processing the structured input according to prescribed rules, and producing results of the processing as output. Examples of a computer include: a computer; a general purpose computer; a supercomputer; a mainframe; a super mini-computer; a mini-computer; a workstation; a micro-computer; a server; an interactive television; a hybrid combination of a computer and an interactive television; and application-specific hardware to emulate a computer and/or software. A computer can have a single processor or multiple processors, which can operate in parallel and/or not in parallel. A computer also refers to two or more computers connected together via a network for transmitting or receiving information between the computers. An example of such a computer includes a distributed computer system for processing information via computers linked by a network.

A "computer-readable medium" refers to any storage device used for storing data accessible by a computer, as well as any other means for providing access to data by a computer. Examples of a storage-device-type computer-readable medium include: a magnetic hard disk; a floppy disk; an optical disk, such as a CD-ROM and a DVD; a magnetic tape; a memory chip.

An example of a non-storage-device-type of computer-readable medium includes a carrier wave used to carry computer-readable electronic data, such as a carrier wave used in transmitting and receiving e-mail or in accessing a network.

"Software" refers to prescribed rules to operate a computer. Examples of software include: software; code segments; instructions; computer programs; and programmed logic.

A "computer system" refers to a system having a computer, where the computer comprises a computer-readable medium embodying software to operate the computer.

A "network" refers to a number of computers and associated devices that are connected by communication facilities. A network involves permanent connections such as cables or temporary connections such as those made through telephone or other communication links. Examples of a network include: an internet, such as the Internet; an intranet; a local area network (LAN); a wide area network (WAN); and a combination of networks, such as an internet and an intranet.

A "sensing device" refers to any apparatus for obtaining visual information. Examples include: color and monochrome cameras, video cameras, closed-circuit television (CCTV) cameras, charge-coupled device (CCD) sensors, complementary metal oxide semiconductor (CMOS) sensors, analog and digital cameras, PC cameras, web cameras, and infra-red imaging devices. If not more specifically described, a "camera" refers to any sensing device.

BRIEF DESCRIPTION OF THE DRAWINGS

Specific embodiments of the invention will now be described in further detail in conjunction with the attached drawings, in which.

DETAILED DESCRIPTION OF EMBODIMENTS OF THE INVENTION

Figure 1B:
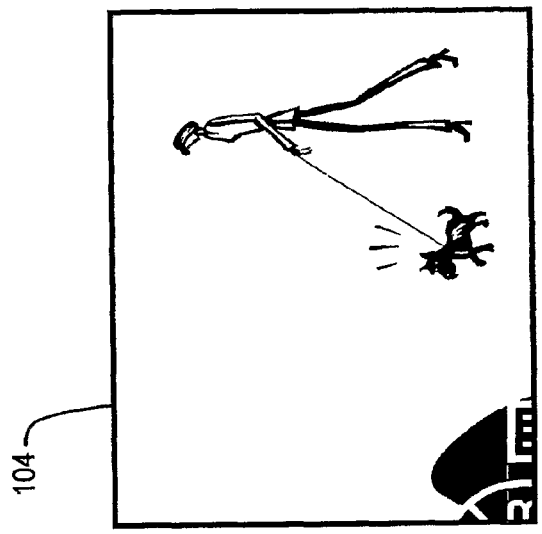
FIGS. 1A-1C depict a conceptual overview of embodiments of the invention, showing primary and secondary video streams for a video scene.
Figure 1C:
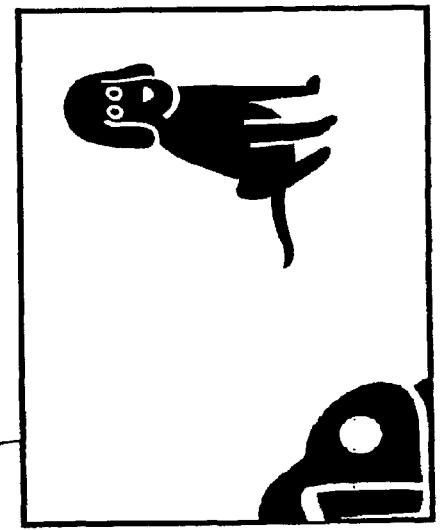
Figure 1A:
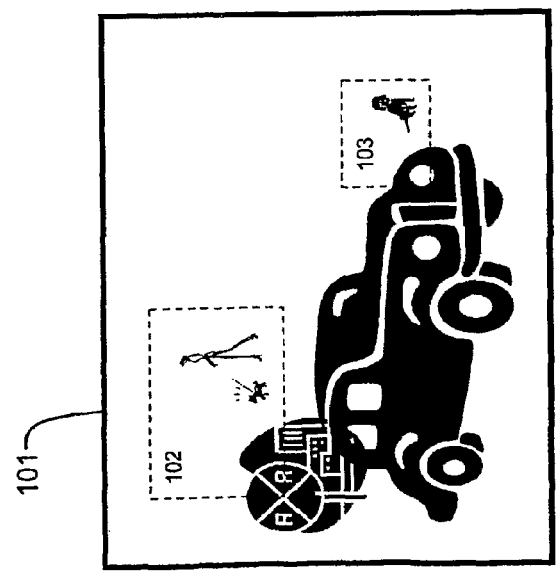

FIGS. 1A-1C depict a conceptual overview of some embodiments of the invention, showing primary and secondary video streams for a video scene. In FIG. 1A, a primary surveillance video stream 101 is shown containing a wide field of view that covers a large physical area. Note especially the presence of small targets for which little detail is available. This may be because of a lack of captured image resolution, available video display resolution, or both. It may be of interest to a viewer of the video stream to obtain more detail about the moving targets in the field of view. For this reason, a user may want to define smaller regions of interest, or "sub-views", within which greater detail may be desired.

In sub-view 102, for example, a target of interest has been identified. Given the area of coverage of primary video stream 101 and the target's location in the field of view, it is difficult to discern identifying details of the subject. In order to obtain more particulars on the target, sub-view 102 may be extracted from primary video stream 101 into a secondary narrow-angle video output. This "virtual field of view" is depicted in FIG. 1B as secondary video stream 104. The extraction method may take the form of software embodied on a computer readable medium, embedded hardware running said software, or in the form of special-purpose hardware (for example, an application-specific integrated circuit (ASIC) or a programmed programmable gate array (PGA)) designed to implement the extraction method. In secondary video stream 104, a greater level of detail is available on the target originally identified in primary video stream 101. Identifying characteristics such as clothing and facial features may now be more easily seen. In sub-view 103 of FIG. 1A, another target of interest has been identified. In this case, the amount of visual detail is so small that it becomes difficult to even identify the type of target being viewed. In order to properly classify the target, sub-view 103 may be extracted into another secondary video output 105 in FIG. 1C. In the exemplary virtual field of view of FIG. 1C, the target is clearly shown with enough detail so that a classification may be applied.

In both of these cases, extracting a secondary video stream containing a virtual field of view from the primary video stream may be used to provide greater detail on targets of interest in the scene. The challenge, then, is to first automatically identify which targets are interesting and to then automatically manage creation and adjustment of secondary video streams. By using video analytic algorithms combined with user guidelines, targets or events of interest can be automatically detected. Software consisting of these algorithms may be used to process incoming videos, to analyze the scene to detect and track targets, and to evaluate target behavior to determine if activity of interest to a user has occurred. Examples of detectable action include, but are not limited to, crossing a virtual tripwire in the scene, appearing, disappearing, loitering, and inserting or removing an item from the scene. Based on the position and other characteristics of targets detected as engaged in these actions of interest, virtual fields of view containing these targets can be determined, and secondary video streams depicting these virtual fields of view can be generated.

Figure 2:
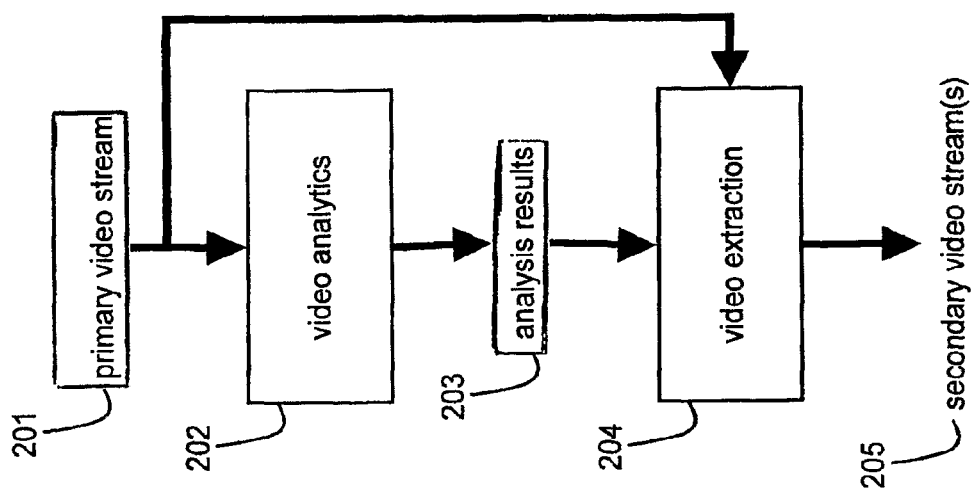
FIG. 2 depicts a conceptual block diagram of the different modules comprising a "leader-follower" embodiment of the invention.

FIG. 2 depicts a conceptual block diagram of the different modules comprising a "leader-follower" embodiment of the invention. This embodiment is herein referred to as "leader-follower" because a primary video stream is used to "lead" the selection and control of "follower" secondary video streams. Primary video stream 201 represents a continuing series of video images, such as one generated by a video camera. These video images may exist either as a continuing series of electrical signals along a cable, such as a video transmitted in the analog television NTSC format, as image data in a computer's memory or on its hard disk, or in any other image format. The visible area contained within the imagery of the primary video stream is referred to as its field of view.

Primary video analytics module 202 may contain software algorithms that may analyze the incoming primary video stream in order to detect targets, events, and areas of interest in the scene. Video analytics algorithms may process incoming image data to perform, for example, target detection, classification, and tracking. Processing results may then be analyzed in order to identify targets satisfying certain predetermined criteria or to detect events, activities, or scene areas of interest. Criteria specifying events and activities of interest may be built into the invention or may be configurable by a user. The output of video analytics module 202 may include summary information about targets, events, and/or areas of interest detected in the incoming video stream. This summary information may include data, such as target location, classification, size, direction, and other characteristics. It may also include data about events detected in the scene, such as changes in scenery. It may also include data about areas of interest in the scene, for example, describing portions of a road that are experiencing atypically high traffic volumes.

These analysis results are represented by element 203 in FIG. 2. Depending on the scene content of the primary video stream and system or user specifications, the primary video analytics module may detect several targets, events, or areas of interest or none at all.

If the analysis results contain targets, events, or areas of interest, then video extraction module 204 may be used to generate one or more secondary video streams 205 from primary video stream 201 in order to provide enhanced views of such targets, events, or areas of interest. An exemplary manner in which this may be done is by extracting an image chunk from each frame of the primary video stream in order to produce a smaller frame covering the desired virtual field of view. Depending on configuration or desired user settings, the image size of secondary video streams may be fixed or may vary based on target size. Similarly, one secondary video stream may be generated for each target of interest, or a fixed number of secondary video streams may be generated only for certain targets, for example, the largest ones or the ones violating user-defined rules of greatest importance. Just as with the primary video stream, these secondary video streams may take on a number of forms, including, but not limited to image data in a computer's memory or on its hard disk. Note that depending on scene content and user configuration, the overall number of secondary video streams generated may vary, or it may be fixed.

Note also that one could conceivably chain together multiple instances of the processing chain depicted in FIG. 2. A secondary video stream generated by one extraction module might be fed into another analysis module, and then fed into another extraction module, and so on.

Figure 3:
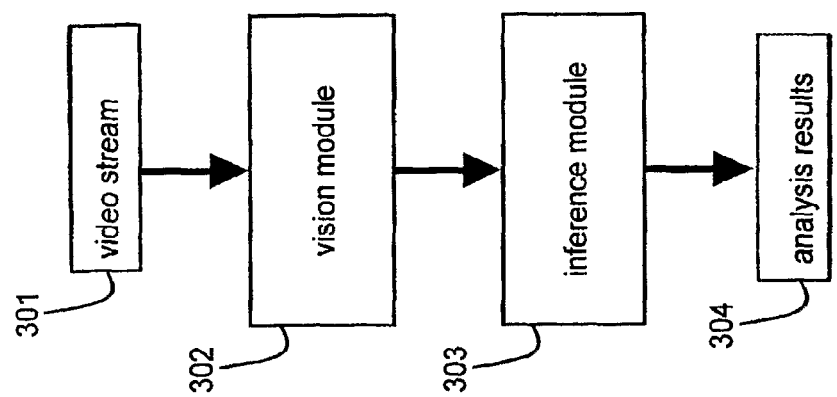
FIG. 3 depicts a conceptual block diagram of a video analytics module according to an embodiment of the invention.

FIG. 3 depicts a conceptual block diagram of video analytics module 202 according to an embodiment of the invention. Video stream 301 represents a continuing series of video images, such as one generated by a video camera. These video images may exist either as a continuing series of electrical signals along a cable, such as a video transmitted in the analog television NTSC format, as image data in a computer's memory or on its hard disk, or in any other image format. The video stream may depict a static view of an area, or it may include camera motion or other changes over time. The visible area contained within the imagery of the primary video stream is referred to as its field of view.

Vision module 302 represents a module to process incoming image data, for example, through target detection, classification, and tracking. This module may include any algorithms required to compensate for camera motion present during video capture. This module may further include algorithms that collect statistical information about targets being tracked as well as the visible scene itself. Depending on the software algorithms that comprise this vision module, various levels of analysis may be performed. If camera calibration data is known about the camera that produced the incoming imagery, then targets may be geo-located in space or associated with a map or satellite image of the scene. The specific algorithms comprising the vision module may vary depending on the desired application. For example, if identification of human targets in the scene is desired, then the vision module may perform facial recognition algorithms to determine such information.

Inference module 303 represents a module to process the analysis results of vision module 302 in order to identify targets satisfying certain predetermined criteria, detect events or activities of interest, or detect particular areas of interest in the scene. Criteria, events, and activities of interest may be built in or may be configurable by a user. This module may include algorithms to analyze the statistical information about tracked targets as computed by the vision module, as well as other auxiliary information about the scene computed by that module, and to determine whether a significant event has occurred. The analysis of this module is not done on video imagery itself; rather, it is done at a higher level, based on the preprocessing done by the vision module.

Analysis results 304 may contain information about all of the detected targets, events, and/or areas of interest found by the inference module's processing of the vision module's output.

Figure 4:
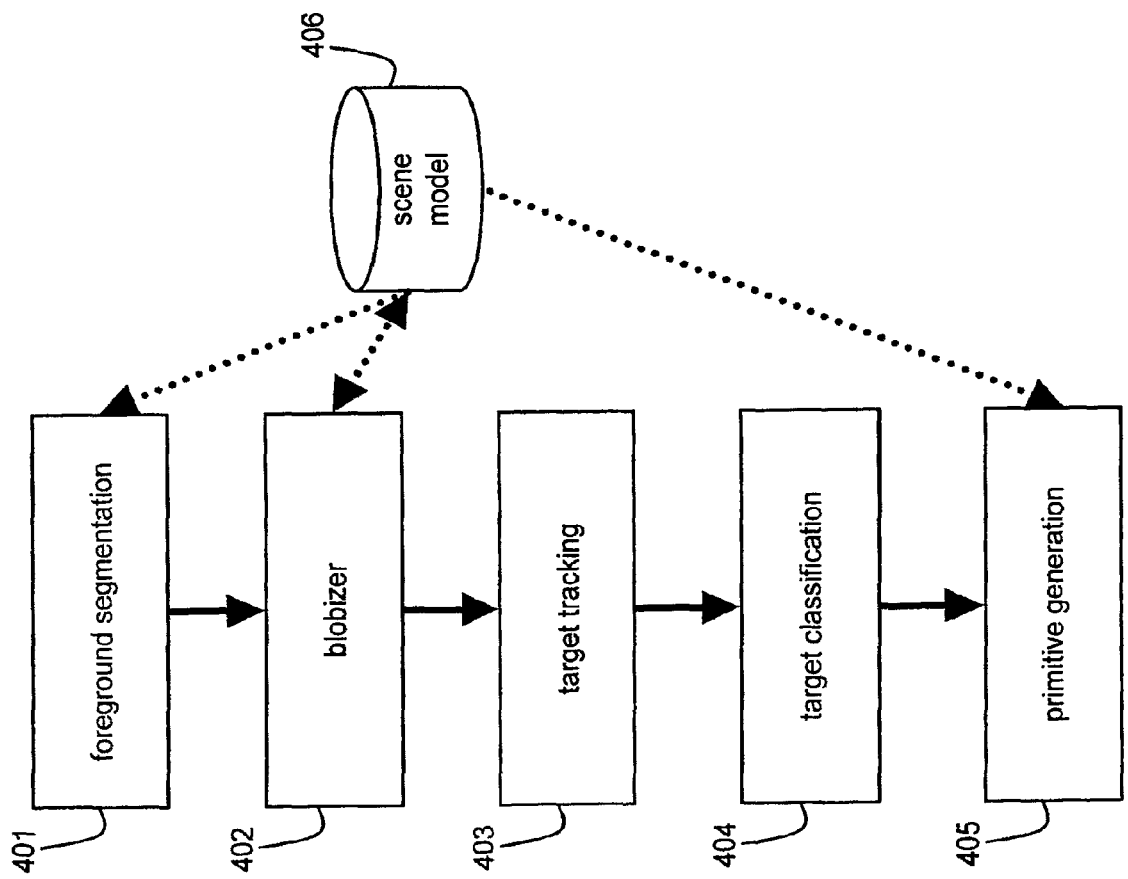
FIG. 4 depicts a conceptual block diagram of a vision module according to an embodiment of the invention.

FIG. 4 depicts a conceptual block diagram of an embodiment of vision module component 302. The exemplary block diagram depicted in FIG. 4 shows algorithms that might be appropriate if the input video stream depicts a stationary view. An alternate exemplary set of algorithms, that might be applicable if the input video stream depicts a moving view, is described below. Note that embodiments of the invention may involve multiple parallel vision modules that process multiple input video streams, or a single vision module that internally does parallel processing to handle multiple input video streams.

Incoming frames from the input video stream device may first go to a module 401 for foreground segmentation, which may analyze the frames and detect regions of the frame that correspond to foreground objects. This module may segment pixels in registered imagery into background and foreground regions. Background regions include areas of the scene that are typically not changing their content significantly from frame to frame; such areas may include, for example, static background areas, such as the wall of a building, as well as moving background areas, such as waving trees or ocean waves. Foreground regions include areas of the scene that include moving or stationary targets. These may include, for example, walking people and moving cars, as well as regions containing newly-modified objects, such as graffiti on a wall or a bag left in a road. Various common frame segmentation algorithms exist to distinguish the foreground and background regions. Motion detection algorithms detect only moving pixels by comparing two or more frames over time. As an example, the three frame differencing technique, discussed in A. Lipton, H. Fujiyoshi, and R. S. Patil, "Moving Target Classification and Tracking from Real-Time Video," Proc. IEEE WACV '98, Princeton, N.J., 1998, pp. 8-14 (subsequently to be referred to as "Lipton, Fujiyoshi, and Patil"), can be used. Unfortunately, these algorithms will only detect pixels that are moving, and which are thus associated with moving objects, and may miss other types of foreground pixels. For example, a bag that has been left behind in a scene and is now stationary could still logically be considered foreground for a time after it has been inserted. Change detection algorithms attempt to identify these pixels by looking for changes between incoming frames and some kind of background model, for example, scene model 406. Over time, a sequence of frames may be analyzed, and a background model may be built up that represents the normal state of the scene. When pixels exhibit behavior that deviates from this model, they may then be identified as foreground. As an example, a stochastic background modeling technique, such as the dynamically adaptive background subtraction techniques described in Lipton, Fujiyoshi, and Patil and in commonly-assigned U.S. Pat. No. 6,954,498 (and hereinafter referred to as "the '498 patent"), may be used. A combination of multiple foreground segmentation techniques may also be used to give more robust results:

Foreground segmentation module 401 may be followed by a "blobizer" 402. A blobizer 402 may be used to group foreground pixels into coherent blobs corresponding to possible targets. Any technique for generating blobs can be used for this block. For example, the approach described in Lipton, Fujiyoshi, and Patil may be used. The results of blobizer 402 may be used to update the scene model 406 with information about what regions in the image are determined to be part of coherent foreground blobs. Scene model 406 may also be used to affect the blobization algorithm, for example, by identifying regions where targets typically appear smaller.

Blobizer 402 may be followed by target tracking module 403. This module may be used to determine how blobs associate with targets in the scene, and when blobs merge or split to form possible targets. A typical target tracker algorithm may filter and predict target locations based on its input blobs and current knowledge of where targets are. Examples of tracking techniques include Kalman filtering, the CONDENSATION algorithm, a multi-hypothesis Kalman tracker (e.g., as described in W. E. L. Grimson et al., "Using Adaptive Tracking to Classify and Monitor Activities in a Site", CVPR, 1998, pp. 22-29), and the frame-to-frame tracking technique described in the '498 patent. If the scene model contains camera calibration information, then module 403 may also calculate a 3-D position for each target. A technique such as the one described in U.S. patent application Ser. No. 10/705,896, filed Nov. 13, 2003, hereafter referred to as "the '896 application," may also be used. This module may also collect other statistics about targets such as their speed, direction, and whether or not they are stationary in the scene. This module may also use a scene model 406 to help it to track targets, and/or may update said scene model with information about the targets being tracked.

Target tracking module 403 may be followed by target classification module 404. This module may be used to determine the type of target being tracked. A target may be, for example, a human, a vehicle, an animal, or another specific type of object. Classification can be performed by a number of techniques, and examples of such techniques include using a neural network classifier and using a linear discriminant classifier, both of which techniques are described, for example, in Collins, Lipton, Kanade, Fujiyoshi, Duggins, Tsin, Tolliver, Enomoto, and Hasegawa, "A System for Video Surveillance and Monitoring: VSAM Final Report," Technical Report CMU-RI-TR-00-12, Robotics Institute, Carnegie-Mellon University, May 2000. This module may also use a scene model 406 to help it classify targets and/or may update scene model 406 with information about the targets being classified.

Finally, primitive generation module 405 may be used to provide summary statistical information about the content of the scene. The primitives generated by primitive generation module 405 may contain information that the downstream inference module 303 might need. These primitives may include pieces of information about each target seen by the vision module, including for example size, position, velocity, color, and texture. These primitives may also contain information from scene model 406, for example, the camera motion for the current frame as well as other environmental changes observed in the scene. Further details of an exemplary process for primitive generation may be found in commonly-assigned U.S. patent application Ser. No. 09/987,707, filed Nov. 15, 2001 (and published as U.S. Patent Application Publication No. 2005/0146605), hereafter referred to as "the '707 application".

Inference module 303 may receive analysis results containing primitive summary statistics from vision module 302 and may process them to detect targets that satisfy certain criteria, to infer when events of interest have occurred, or to identify areas of particular interest in the scene. Targets of interest may include those moving too quickly or slowly or those exhibiting other characteristics or behaviors. Events of interest may include targets leaving a bag behind, targets stealing something from a scene, or other general events that might occur in a video stream. Areas of interest in a scene might include those with atypical traffic patterns or particular visual characteristics. These criteria may either be automatically detected, which may be done, for example, during system configuration, or they may be specified by a user through some interface. The inference module might do its processing through an approach, for example, such as the one described in the '707 application.

Once a target, event, and/or area of interest or area of interest is detected by the inference module 303, inference module 303 may send notification and all relevant information on to video extraction module 204. This notification might include all of the information about the targets that engaged in a particular event, including, for example, their location, direction, and appearance. This notification might also include the latest information about the scene model received from the vision module 302; for example, information about the background region that targets of interest are currently in, might be sent.

The inference module 303 may also maintain a list of currently active targets of interest, along with information about when they were last seen. It may periodically send this information on to the extraction module 204 to make sure that each target is continuously seen for a while, even if the targets do not continue to perform events of interest.

Video extraction module 204 may be used to generate one or more secondary video output streams from a primary video input stream and may also generate selective video analytics results. The video extraction module 204 may exist as a software module embodied on a computer readable medium, embedded hardware running said software, for example, in devices such as video cameras or digital video recorders (DVRs), or in the form of special-purpose hardware (for example, an application-specific integrated circuit (ASIC) or a programmed programmable gate array (PGA)) designed to implement the extraction method. Video cameras and digital video recorders are simply two exemplary devices in which extraction modules may be embedded. It would be possible to embed a video extraction module on any number of devices that may be used to process video streams. The extraction module 204 may use the same video stream as used by the video analytics module 202 to create the secondary output stream, or it may use a copy of that video stream. In the example of the extraction module 204 residing on a computer readable medium and being run on a computer, the primary video stream may exist as an in-memory video buffer, while in the example where the extraction module 204 is embedded in a hardware device, such as a video camera, the primary video stream may be obtained directly from the video camera's charge-coupled device (CCD) array.

The video extraction module 204 may input a primary video stream from a video camera, network feed, or other video source, as well as a set of target, event, and/or area of interest information, which may result from the video analytics processing that may be performed by video analytics module 202, to generate zero or more secondary video outputs. Additionally, a set of user preferences may be supplied to the video extraction module manually by a user during the module's initialization phase or at certain points during the module's lifecycle. It should be noted that typical embodiments of the extraction module 204 may accept a single video source as the primary video source. However, it is possible for an extraction module 204 to accept any number of video sources as inputs, even a generated secondary video output, as discussed further below. Discussion here continues focusing on how secondary video streams might be extracted from a single primary video stream, although extensions of this approach to multiple streams follow logically.

To create secondary video streams, the video extraction module 204 may accept as input a set of data describing targets, events, and/or areas of interest in the primary video stream as reported by the analysis module. This input data may contain information describing zero or more targets in the primary video stream. The exact number of targets of interest will be dictated by the number of objects in the scene of the primary video source, the actions of said objects, and a set of requirements supplied to the analysis module by either a manual operator or the video surveillance system as a whole. The information describing each target of interest in the primary video source may include, but is not limited to, a bounding box describing the location and size of the target of interest in relation to the imagery making up the primary video stream, a footprint describing the x-y location of the base of the target of interest in relation to the primary video stream, and a classification describing the type of target as interpreted by the analysis module. Possible classifications for a target of interest may include, but are not limited to, human or vehicle.

The video extraction module 204 may use all, some, or none of the data supplied in the analysis results to extract the secondary video stream from the primary video stream. One exemplary embodiment of the video extraction module 204 could be the extraction of a "best-shot" video stream describing one or more targets of interest. In this embodiment, the analysis results could include a bounding box and classification for one or more targets of interest. Knowing that the best view of a target may vary depending on its type, the video extraction module could vary the extraction algorithms based on a target's classification. For example, the best-shot for a target of human classification may be a video stream clearly depicting the subject's face. In this instance, the video extraction module may, for example, extract into a secondary video stream the top $\frac{1}{7}^{th}$ of the target's bounding box. In another exemplary embodiment, the extraction module could receive analysis results in which the targets of interest are of classification type vehicle. In this instance, the best-shot for a target of vehicle classification might include the region surrounding the target's license plate, allowing for vehicle identification. For this type of target, the video extraction module might use the bounding box of the target, as supplied by the analysis module, to extract the frontal region of the target into a secondary video stream. Other techniques for extracting best shots, such as the ones described in the '896 application, may also be used.

Another embodiment of the video extraction module 204 may involve a more complicated method of determining the region to extract into a secondary video output given information about targets of interest. In addition to the analysis results 203 that may be supplied by the video analytics module 202, the video extraction module 204 could also receive a set of configuration information from an external source. This configuration, or calibration, could dictate how the extraction module would create the secondary video stream 205. This calibration information may be created by a manual user and supplied to the video extraction module 204 at initialization or another point of the module's lifecycle. Alternatively, calibration information may be created manually by a user once and stored on a computer-readable medium for use across one or more sessions of the video extraction module 204. By supplying a calibration set to the video extraction module 204, greater flexibility could be achieved in extracting secondary video streams 205. Take, for example, a primary video stream 201 coming from a wide-angle video camera that is monitoring a moderately traveled pedestrian walkway. In this scenario, the video extraction module 204 could be used to create best-shot video streams of targets of interest. However, for this particular scenario, the best-shot may vary according to the target's orientation. Specifically, if the target of interest is traveling towards the video camera that is providing the primary video source, the best-shot could be a video stream clearly displaying the subject's face. However, if the target is traveling away from the video camera providing the primary video source, the subject's face would not be visible in the primary video source, and the best-shot could be a wider-angle view of the subject. By supplying a calibration set to the video extraction module 204, a user may be able to dictate that the extraction module 204 extract a secondary stream 205 that is centered tightly on the target's face when the target's velocity vector is traveling in the direction of the primary video source. When the target's velocity vector is traveling away from the primary video source, the same calibration set could be used by the video extraction module 204 to create a secondary video stream 205 that displays more details on the subject, such as clothing and body dimensions.

In one embodiment of the invention, the primary video stream 201 may be supplied to the video analytics module 202 in a specific video resolution. The video analytics module 202 may process the primary video stream 201 at this resolution and supply results 203 to the video extraction module 204, in a coordinate system using the same resolution. Alternatively, the video analytics module 202 may opt to supply analysis results 203 to the video extraction module 204, in a relative coordinate system, by normalizing the results against the pixel resolution of the primary video stream 201. For example, the video analytics module 202 may receive the primary video stream 201 from a video camera at a 320×240 pixel resolution. The video analytics module 202 may process the primary video stream 201 at the same resolution and supply to the video extraction module 204, the analysis results 203 in an absolute coordinate system based on the 320×240 pixel resolution. In this scenario, the video extraction module 204 could use the analysis results 203 in absolute coordinates, to extract a secondary video stream 205 from the primary video stream 201 at pixel resolution of 320×240. Alternatively, if the video analytics module 202 opted to supply analysis results 203 in a relative coordinate system, the extraction module 204 could still use the supplied results 203 to extract a secondary video stream 205 from the primary video stream 201 at 320×240 pixel resolution. In this particular example, the secondary video stream 205 extracted using the absolute coordinate system and the secondary video stream 205 extracted using the relative coordinate system are likely to be very similar for a given target of interest, as long as the extraction was performed on the same pixel resolution primary video stream 201 in both cases.

In one embodiment of the invention, the primary video stream 201 may be supplied in a specific high resolution format. For optimization purposes, the video analytics module 202 may opt to down-sample the primary video stream 201 to a lower resolution, before processing the video stream for targets of interest, event detection, and changes to the scene. For example, the primary video stream 201 may be generated from a video camera that has a pixel resolution of 640×480. In order to optimize the resources used on the device performing the analysis, the video analytics module 202 may down-sample the 640×480 video stream to a lower quality 320×240 pixel resolution before performing the analysis process. In this scenario, the video extraction module 204 may either receive the analysis results 203 in a relative coordinate system, where target information has been normalized by the video analytics module 202, in a coordinate system scaled to the primary video stream 201 before being down-sampled, e.g., 640×480, or in a coordinate system scaled to the primary stream 201 after being down-sampled, e.g., 320×240.

Regardless of how the analysis results are provided to the video extraction module 204, either the unmodified primary video stream 201 or the down-sampled video stream may be used to extract the secondary video stream 205. For example, suppose that the video analytics module 202 has detected a target of interest in the down-sampled video stream. Based on the 320×240 resolution of the down-sampled video stream, the video analytics module 202 has supplied to the video extraction module 204 target dimensions of 10×30 pixels. In this situation, the video extraction module 204 may opt to extract the region surrounding the target of interest from the down-sampled video stream and produce a secondary video stream 205 from the 10×30 sub-region. However, if this particular implementation needs a greater level of detail, the video extraction module 204 may opt to use the unmodified primary video stream 201 to extract a higher quality secondary video stream 205. In this case, the extraction module 204, to obtain an equivalent-size region, would extract a 20×60 sub-region around the target of interest, thereby providing a more detailed view of the subject.

Video extraction input data may also contain information about events of interest as detected by the video analytics module 202. For example, the video analytics module 202 may detect that an object has been left behind in the scene. In this case, there may not be any moving targets around the newly inserted object, but it may still be desirable to have an extracted secondary video stream showing this new object. Based on information about the inserted object, such as its location and size, the extraction module 204 may extract a secondary video feed 205 targeted on it. Another exemplary event of interest that might occur is a certain interaction between multiple targets, for example, if two people walk past each other. In this case, it might be desirable to have a single secondary video stream 205 containing both targets of interest. Based on detected event information as reported by the video analytics module 202, the video extraction module 204 might generate a secondary video stream 205 containing all involved targets, as opposed to just one.

Video extraction input data may also contain information about areas of interest in the scene, for example, portions of a road undergoing abnormal traffic patterns. Information, such as the area location and extent in the input video stream 201 imagery, may be used by the extraction module 204 to generate a secondary video stream 205. Similar techniques to those described above for extracting feeds based on targets of interest may also be used for these cases where events or areas of interest are to be targeted.

Figure 5:
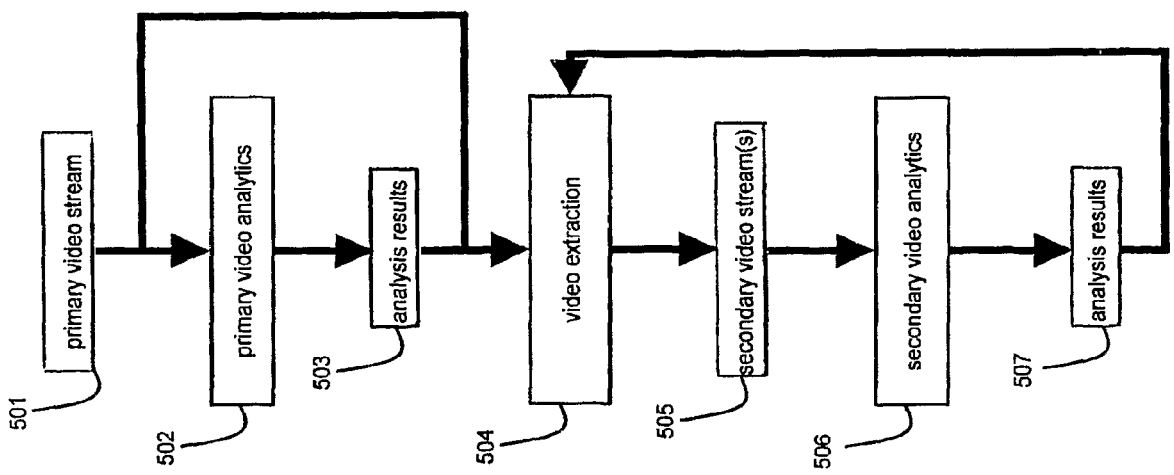
FIG. 5 depicts a conceptual block diagram of the different modules comprising an exemplary "tasked active tracking" embodiment of the invention.

FIG. 5 depicts a conceptual block diagram of the different modules that may comprise a "tasked active tracking" embodiment of the invention. This embodiment is herein referred to as "tasked active tracking" because a primary video stream 501 is used to initially "task" a secondary video stream 505 to a target of interest, and then that target may be actively tracked through recursive processing of that secondary video stream 505.

Elements 501, 502, and 503 in FIG. 3 correspond to elements 201, 202, and 203 in FIG. 2. In the tasked active tracking embodiment of the invention, a primary video stream 501 is initially analyzed using video analytic algorithms to determine targets of interest. Upon initial detection of a new target, event, or area of interest, video extraction module 504 initially extracts a relevant secondary video stream that depicts the virtual field of view containing that target, event, or area. This procedure is similar to its operation in the leader-follower embodiment.

Any extracted secondary video streams 505 generated by video extraction from the primary video stream 501 may then be processed by a second video analytics module 506. This module is similar in function to its counterpart 202 in FIG. 2, except that it may be used to process an extracted secondary video stream 505 instead of a primary video stream 501. For example, consider a primary video stream 501 where a moving target appears in the field of view. Primary video analytics 502 may be used to process this primary video stream 501 and to detect the target, and video extraction 504 may be used to generate a secondary video stream 505, based at least in part on analysis results 503 from primary video analytics module 502, that may provide greater detail or an enhanced view of this target. A secondary video analytics module 506 may then be used to process this secondary video stream 505 to continue to detect and track the target. Each secondary video stream 505 generated by video extraction 504 may be processed independently, allowing multiple targets to be viewed simultaneously through multiple secondary video streams 505.

After this processing, analysis results 507 describing the targets, events, and/or areas of interest may continually be generated and may, again; contain relevant information about the speed, size, location, and/or other properties of the targets, events, and/or areas of interest. This information may be specific to the characteristics of the described element of interest in the secondary video stream 505 from within which it has been detected, or it may be related back to its original appearance in the primary video stream 501.

Target information may then be fed back into video extraction module 504. Recall that this module initially extracted a secondary video stream 505 from a primary video stream 501 based on the detection of items of interest by the primary video analytics module 502. By feeding back analysis results as detected by a secondary video analytics module 506 operating on said secondary video stream 505, continual tracking of the items of interest can be continued without additional processing of the primary video stream 501. In this way, the tracking of the target, event, or area of interest becomes "active", as the field of view of the extracted secondary video stream 505 may be adjusted solely by its own content.

Any secondary video streams 505 extracted by the video extraction module 504 may be fed into a secondary video analytics module 506. This module may be similar in function to the primary video analysis module 502 as described above, and it can be depicted conceptually through use of a block diagram such as the one in FIG. 3. This secondary video analytics module 506 may, however, use different algorithms in its vision and inference modules.

Because the video streams processed by the secondary video analytics module 506 may be tied to moving targets of interest in the scene, the video content processed by that module may depict a moving field of view. The focus of the secondary video stream 505 following a moving target may generally move with that target. In such a case, the exemplary algorithms described above in FIG. 4 for use in the vision module 302 (forming part of secondary video analytics module 506) may be insufficient.

Figure 6:
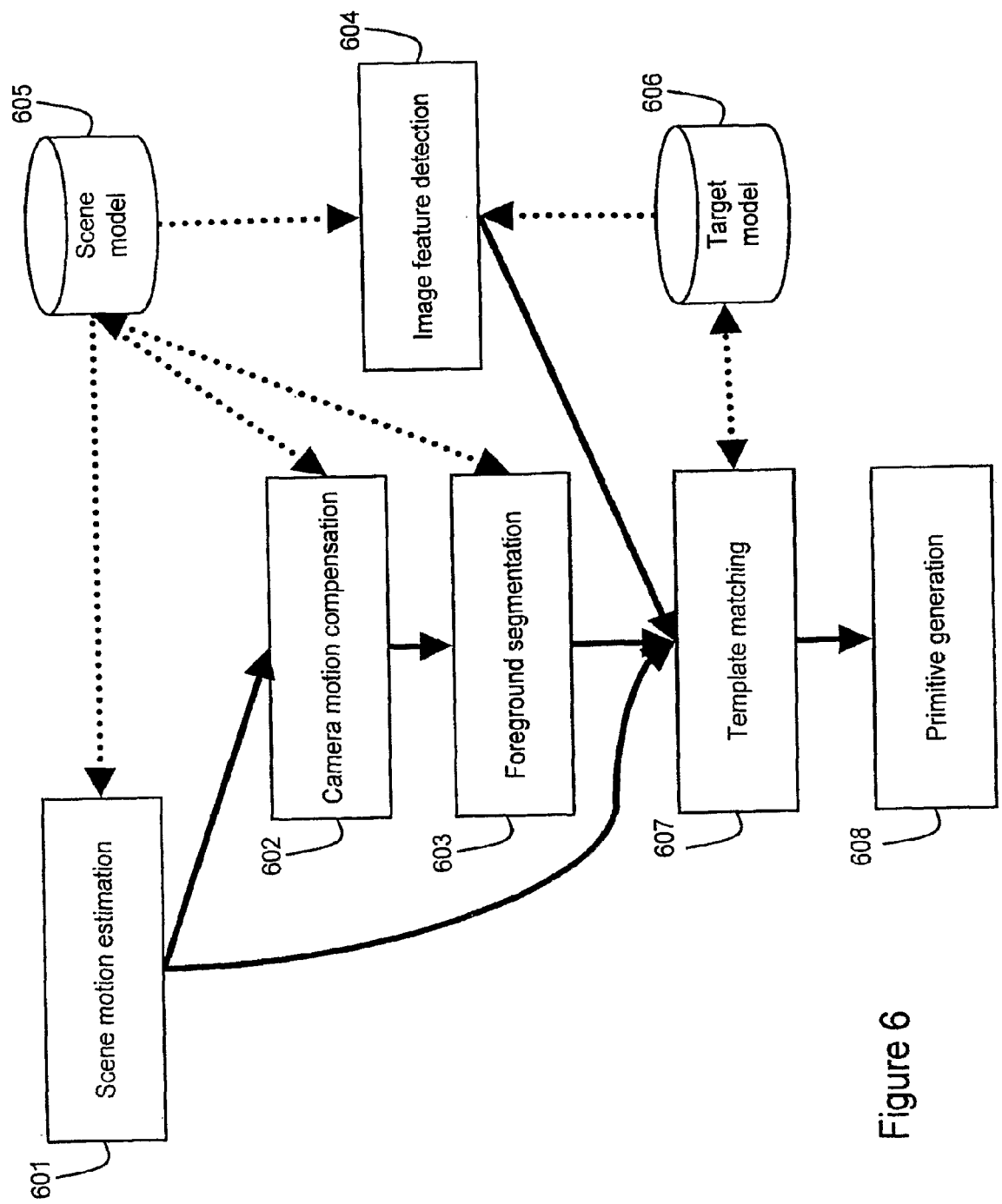
FIG. 6 depicts a conceptual block diagram of a vision module configured to actively track targets, according to an embodiment of the invention.

FIG. 6 depicts a conceptual block diagram of a vision module 302 that may be used, instead, by secondary video analytics module 506 to enable the active tracking of targets. This vision module configuration has the capability to handle the case where the video's virtual field of view is actively being moved in order to continuously track a moving target. FIG. 6 depicts an exemplary set of algorithms that may be used for this purpose; other algorithms may also be used. As in the conceptual block diagram described above in FIG. 4, the vision module may be used to process incoming video and to generate summary statistics describing the video content. In order to keep a detailed view of a moving target of interest in an extracted secondary video stream 505, the extraction module 504 may, for example, be directed to always extract a chunk of imagery that keeps the target of interest in the center of the camera view. FIG. 6 shows an exemplary implementation of a vision module that uses template matching to continuously track a target while the field of view of the secondary video stream 505 is being changed. This implementation may be initialized with current information about the target being tracked as reported by the primary analytics module 502.

Module 601 may perform scene motion estimation and may attempt to find both camera motion and the motion of the target being tracked. Camera motion estimation may typically involve analyzing incoming frames to determine how the camera or field of view was moving when they were generated. Because a secondary video stream 505 extracted from a primary video stream 501 may be generated by a video extraction module 504, information about how they relate to each other may be known. The video extraction module 504 may record or output the source position of each secondary video frame in each primary video frame, and this information can be used to infer the relative motion between frames. However, depending on the particular implementation of the system, this information may not be available, or it may come with a certain amount of delay that might make it unusable for real-time applications. For this reason, it may be necessary to estimate the relative camera motion between frames based solely on the content of the secondary video stream 505.

Many state-of-the-art algorithms exist to perform camera motion estimation. One such technique is described in commonly-assigned U.S. Pat. No. 6,738,424. Note that module 601 may also make use of scene model 408 if it is available. Many common techniques make use of a scene model, for example, a background mosaic, as a way to aid in camera motion estimation. Another technique is described in commonly-assigned U.S. patent application Ser. No. 11/222,223, filed Sep. 9, 2005, hereinafter referred to as "the '223 application." One potential drawback of these techniques is that they may perform best when the scene being analyzed consists mainly of stationary background. When processing a secondary video stream 505 that has been extracted from a primary video stream 505, it is assumed that the tracked target of interest will mostly likely take up more of the scene in the secondary video stream 505 than in the primary video stream 501. This, in turn, may leave fewer distinguishable background features, which are usually one of the main inputs to typical camera motion estimation algorithms. For this reason, it may be desirable to use a camera motion estimation technique that attempts to also distinguish the motion of the target being tracked. One common approach is to use an optical flow technique to look at the motion of some or all pixels in the scene. The dominant motion will generally be the camera motion; the second most dominant will generally be the target motion. Another technique is described in the '896 application. Note that scene model 605 may be used to initialize this motion estimation; when first beginning to process a secondary video stream 505, some information may be known about the area of the scene where the target is located. For example, a chunk from a background mosaic containing information about the background region behind the target may be used to aid in camera motion estimation. This scene model 605 may, therefore, be derived from or may be the same model as scene model 406 in the primary analytics module 502.

Once the camera motion has been determined, then the relationship between successive frames is known. This relationship might be described through a camera projection model consisting of, for example, an affine or perspective projection. Incoming video frames from a moving secondary video stream 505 can then be registered to each other so that differences in the scene (e.g., foreground pixels or moving objects) can be determined without the effects of the camera motion. Frames may be registered to a common reference through a camera motion compensation module 602. Successive frames may be registered to each other or may be registered to a scene model 605, which might, for example, be a background mosaic. A technique that uses a scene model in this way is described in the '223 application.

Aligned frames may next go to a foreground segmentation module 603, which may analyze the frames and may detect the regions of the frame that correspond to foreground objects. The algorithm's used here may be similar to the ones used in element 401 in the embodiment described above. Note that, as in previous steps, a scene model 608 might be used to aid in this process. Also note that, due to the decreased number of background pixels likely visible in a scene focused on a foreground object, it is possible that the results of the foreground segmentation module may not be as accurate as in the previously discussed embodiment. For this reason, the foreground pixels output from foreground segmentation module 603 may form just one input to template matching module 607.

Image feature detection module 604 may be used to detect features in the secondary video imagery that may provide cues as to where in each frame the moving target of interest is located. For example, edges or texture patches may be detected near the area where the target is predicted to be. As another example, intensity or color histograms might be extracted from areas in the scene. Target model 606, which may contain a current model of the tracked target's appearance and motion characteristics, might be used to initialize the algorithms of image mature detection module 604. Initialization of target model 606 might use information from the last known appearance of the target when extraction of the secondary video stream began.

Template matching module 607 may perform template matching and may be used to attempt to identify the location of the target being tracked in the incoming frames of the moving secondary video stream 505. It can use a variety of cues to do this, including the target motion output of module 601, the foreground segmentation output of module 603, and/or the image feature outputs of module 604. Other calculable features might also be used to form a template that describes the current appearance of the target being tracked. A current model of the tracked target's appearance and motion characteristics may be contained in target model 606; this model may be used to match against different areas of the image in order to find the target's location. An approach such as the one described in the '896 application might be used to weight the different features in order to compute the best match. Ideally, an approach that is robust to different camera motions and changes in the target's appearance should be used; however, the invention is not limited to this approach. Once the target has been located in the latest image, the target model 606 may be updated so that it contains updated information about the target.

Finally, primitive generation module 608 may operate similarly to corresponding primitive generation module 405. It may generate summary statistics about the tracked target as it appears in the field of view, which may be based on information calculated by one or more of the previous modules.

In a tasked active tracking embodiment of the invention, the inference module component 303 of the primary video analytics module 502 may operate similarly to the manner described above for a leader-follower embodiment. The inference module 303 in the secondary video analytics component 506 may have criteria for identifying targets, events, or areas of interest that are different from those used in the inference module 303 in the primary video analytics component 502. For example, the inference module 303 of the secondary video analytics component 506 may attempt to continuously report on a target of interest's position as long as it remains within the field of view. Other types of criteria, as described above, may also be used.

In a tasked active tracking embodiment of the invention, the extraction module 504 may operate similarly to the manner described above for a leader-follower embodiment. Note that the extraction module 504 may simultaneously be extracting new secondary video streams 505 for targets, events, or areas of interest detected in a primary video stream 501, while at the same time be continuously extracting secondary video streams 505 for previously detected targets, events, or areas of interest being tracked in said secondary video streams 505.

Figure 7:
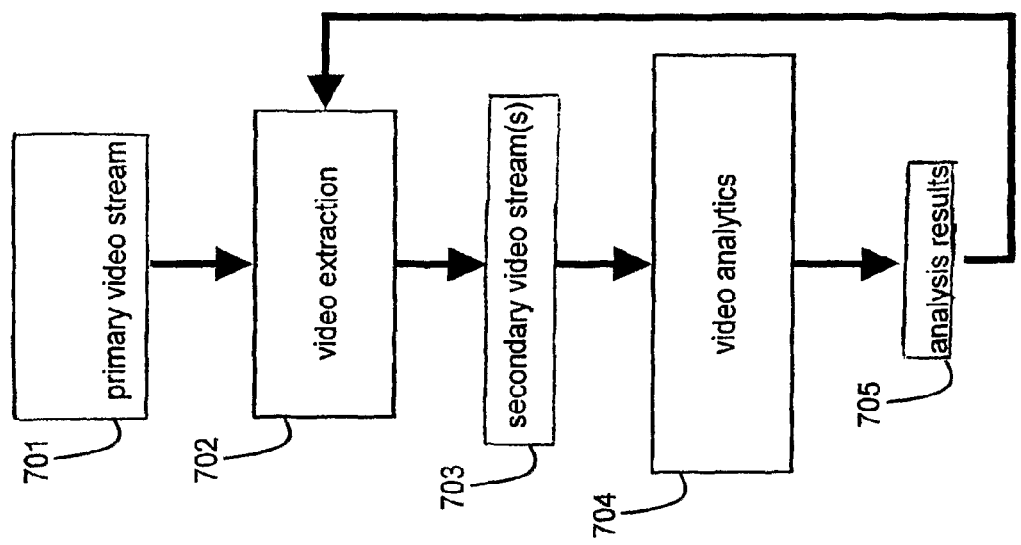
FIG. 7 depicts a conceptual block diagram of the different modules comprising a "scanning active tracking" embodiment of the invention.

FIG. 7 depicts a conceptual block diagram of the different modules that may comprise a "scanning active tracking" embodiment of the invention. This embodiment may generally be similar to the latter half of the tasked active tracking embodiment, but it may use a different methodology for initializing secondary video streams 703. All modules in this embodiment have their counterparts in the latter half of the previous embodiment, with the exception of a primary video analytics module to process the primary video stream 701 to determine initial targets, events, and/or areas of interest in the scene.

Because there is no primary video analytics module to detect initial targets, events, and/or areas of interest in the scene for the video extraction module 702 to use to generate secondary video streams 703, initial generation of these streams must be driven by something else. In this embodiment, the video extraction module 702 may be configured to automatically generate secondary video streams 703 based solely on predefined areas in the primary video stream 701. For example, the video extraction module 702 may extract ten secondary video streams 703 from predefined locations and with predefined sizes in the primary video stream 701. Or, as another example, it may "scan" a smaller extracted secondary video feed 703 back and forth across the field of view of the primary video stream 701 in a raster pattern, looking for targets of interest. In both cases, if processing of a configured secondary video stream 703 finds a target, event, and/or area of interest, the secondary video stream 703 may be adjusted to track that element of interest, or another secondary video stream 703 may be generated to do so. This may be guided by analysis results 705 that may be generated by a video analytics module 704 operating on the one or more secondary video streams 703. Video analytics module 704 may be similar to secondary video analytics module 506 of the previous embodiment. If another secondary video stream 703 is generated, then the original configured secondary video stream 703 at a predefined location or a scanning pattern may be continued or may be stopped.

Figure 8:
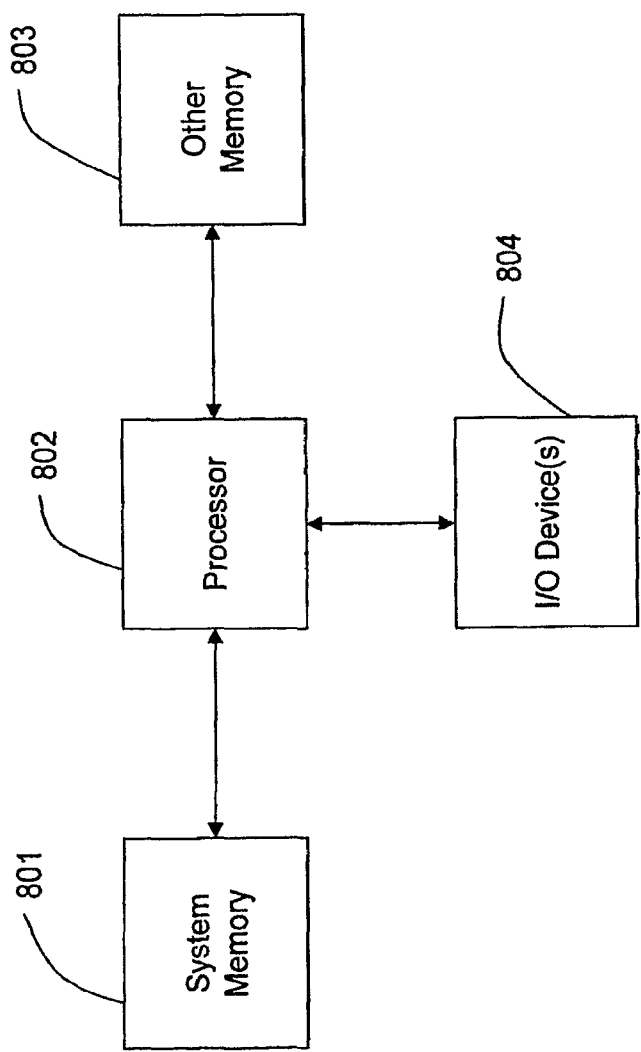
FIG. 8 depicts a conceptual block diagram of an exemplary computer system that may be used in various embodiments of the invention.

Some embodiments of the invention, as discussed above, may be embodied in the form of software instructions on a machine-readable medium. Such an embodiment is illustrated in FIG. 8. The computer system of FIG. 8 may include at least one processor 802, with associated system memory 801, which may store, for example, operating system software and the like. The system may further include additional memory 803, which may, for example, include software instructions to perform various applications. The system may also include one or more input/output (I/O) devices 804, for example (but not limited to), keyboard, mouse, trackball, printer, display, network connection, etc. The present invention may be embodied as software instructions that may be stored in system memory 801 or in additional memory 803. Such software instructions may also be stored in removable or remote media (for example, but not limited to, compact disks, floppy disks, etc.), which may be read through an I/O device 804 (for example, but not limited to, a floppy disk drive). Furthermore, the software instructions may also be transmitted to the computer system via an I/O device 804 for example, a network connection; in such a case, a signal containing the software instructions may be considered to be a machine-readable medium.

The invention has been described in detail with respect to various embodiments, and it will now be apparent from the foregoing to those skilled in the art that changes and modifications may be made without departing from the invention in its broader aspects. The invention, therefore, as defined in the appended claims, is intended to cover all such changes and modifications as fall within the true spirit of the invention.

We claim:

1. A method of automatically generating a plurality of secondary video streams based on an incoming primary video stream, comprising:
   performing video analytics on the primary video stream to generate one or more analysis results by one or more hardware processors, the one or more analysis results including information relating to at least one element selected from the group consisting of an event and an area of interest, wherein the analysis results are generated using an inference module with one or more user customizable rules;
   detecting, by the one or more hardware processors, one or more events in the primary video stream based on the one or more analysis results, wherein the one or more events refers to one or more objects engaged in an activity; and
   automatically extracting, by the one or more hardware processors, the plurality of secondary video streams from the primary video stream based on the one or more analysis results, wherein a field of view of one or more video streams in the plurality of secondary video streams is smaller or equal to than a field of view of the primary video stream.

2. The method according to claim 1, wherein said performing video analytics comprises:
   applying the primary video stream to a vision module; and
   applying results obtained from said vision module to the inference module.

3. The method according to claim 2, wherein said applying the primary video stream to a vision module comprises:
   performing target detection.

4. The method according to claim 3, wherein said applying the primary video stream to a vision module further comprises:
   performing at least one operation selected from the group consisting of classifying at least one target and tracking at least one target.

5. The method according to claim 2, wherein said applying the primary video stream to a vision module comprises:
   performing camera motion compensation.

6. The method according to claim 2, wherein said applying the primary video stream to a vision module comprises:
   identifying one or more foreground portions in the primary video stream;
   grouping the one or more foreground portions into one or more targets; and
   generating at least one video primitive describing at least one characteristic of at least one of said one or more targets.

7. The method according to claim 6, wherein said applying the primary video stream to a vision module further comprises:
   tracking said one or more targets; and
   classifying said one or more targets.

8. The method according to claim 2, wherein said applying results obtained from said vision module to the inference module comprises:
   applying the one or more user customizable rules to said results obtained from said vision module, the one or more user customizable rules selected from the group consisting of: an event criterion and an area of interest criterion.

9. The method according to claim 8, wherein said applying results obtained from said vision module to the inference module further comprises:
   maintaining a list of one or more currently active targets of interest.

10. The method according to claim 1, wherein said automatically extracting comprises:
    extracting a best-shot video stream including one or more targets of interest.

11. The method according to claim 1, wherein said automatically extracting comprises:
    receiving configuration information to be used in determining how to extract at least one secondary video stream.

12. The method according to claim 1, wherein said automatically extracting comprises:
    operating on a down-sampled version of the primary video stream to extract a secondary video stream from the plurality of secondary video streams, wherein the secondary video stream is selected from the group consisting of:
    a secondary video stream extracted from the primary video stream; and
    a secondary video stream extracted from the down-sampled version of the primary video stream.

13. The method according to claim 1, further comprising:
    extracting a tertiary video stream from the plurality of secondary video streams, wherein the tertiary video stream has a same frame rate as the secondary video stream.

14. The method according to claim 1, wherein the primary video stream was previously recorded.

15. The method according to claim 1, further comprising:
    estimating camera motion by analyzing incoming frames to determine how the camera or field of view was moving when the incoming frames were generated.

16. The method according to claim 1, wherein the activity includes at least one of stealing, entering, exiting, loitering, leaving an object, crossing a virtual tripwire, or removing an item.

17. An apparatus to automatically generate a plurality of secondary video streams based on an incoming primary video stream, comprising:
  a video analytics module executed by one or more hardware processors, the video analytics module operating on the primary video stream to:
    generate one or more analysis results, the one or more analysis results including information relating to at least one element selected from the group consisting of an event and an area of interest, wherein the analysis results are generated using an inference module with one or more user customizable rules, and
    detect one or more events in the primary video stream based on the one or more analysis results, wherein the one or more events refers to one or more objects engaged in an activity; and
  a video extraction module executed by the one or more hardware processors, the video extraction module automatically extracting the plurality of secondary video streams from the primary video stream based on the one or more analysis results, wherein a field of view of one or more video streams in the plurality of secondary video streams is smaller than or equal to a field of view of the primary video stream.

18. The apparatus according to claim 17, wherein said video analytics module comprises:
  a vision module, wherein the inference module receives results from said vision module.

19. The apparatus according to claim 18, wherein said vision module comprises:
  a segmentation module;
  a blobizer; and
  a primitive generation module.

20. The apparatus according to claim 19, wherein said vision module further comprises:
  a target tracking module; and
  a target classification module.

21. The apparatus according to claim 17, wherein at least one of said modules comprises at least one device to implement at least a portion of the functionality of said at least one of said modules, said device selected from the group consisting of: a special-purpose hardware device and a programmable hardware device.

22. A method of automatically generating a plurality of secondary video streams based on an incoming primary video stream, comprising:
  performing first video analytics on the primary video stream to generate one or more first analysis results by one or more hardware processors, the one or more first analysis results including information relating to at least one element selected from the group consisting of an event and an area of interest, wherein the first analysis results are generated using a first inference module with one or more user customizable rules;
  detecting, by the one or more hardware processors, one or more events in the primary video stream based on the one or more first analysis results, wherein the one or more events refers to one or more objects engaged in an activity;
  automatically extracting, by the one or more hardware processors, the plurality of secondary video streams from the primary video stream based on the one or more first analysis results, wherein a field of view of a secondary video stream from the plurality of secondary video streams is smaller than or equal to a field of view of the primary video stream;
  performing second video analytics, by the one or more hardware processors, on said plurality of secondary video streams to provide one or more second analysis results; and
  feeding back, by the one or more hardware processors, said one or more second analysis results such that said automatically extracting the plurality of secondary video streams is further based on said one or more second analysis results.

23. The method according to claim 22, wherein said performing first video analytics comprises:
  applying the primary video stream to a first vision module; and
  applying results obtained from said first vision module to the first inference module.

24. The method according to claim 23, wherein said applying the primary video stream at a first vision module comprises:
  performing target detection.

25. The method according to claim 24, wherein said applying the primary video stream at a first vision module comprises at least one operation selected from the group consisting of performing target classification and performing target tracking.

26. The method according to claim 23, wherein said applying the primary video stream at a first vision module comprises:
  performing camera motion compensation.

27. The method according to claim 23, wherein said applying the primary video stream at a first vision module comprises:
  identifying one or more foreground portions in the primary video stream;
  grouping the one or more foreground portions into one or more targets; and
  generating at least one video primitive describing at least one characteristic of at least one of said one or more targets.

28. The method according to claim 27, wherein said applying the primary video stream at a first vision module further comprises:
  tracking said one or more targets; and
  classifying said one or more targets.

29. The method according to claim 23, wherein said applying results of said first vision module to said first inference module comprises:
  apply the one or more user customizable rules to said results obtained from said first vision module, the one or more user customizable rules are selected from the group consisting of: an event criterion and an area of interest criterion.

30. The method according to claim 29, wherein said applying results of said first vision module to said first inference module further comprises:
  maintaining a list of one or more currently active targets of interest.

31. The method according to claim 22, wherein said performing second video analytics on said plurality of secondary video streams comprises:
  applying at least one secondary video stream from the plurality of secondary video streams to a second vision module; and
  applying results obtained from said second vision module to a second inference module.

32. The method according to claim 31, wherein said applying the at least one secondary video stream to a second vision module comprises:
estimating scene motion in said at least one secondary video stream;
performing camera motion compensation on the at least one secondary video stream to provide at least one compensated secondary video stream;
identifying one or more foreground portions of said at least one compensated secondary video stream;
identifying at least one location of at least one target in said at least one compensated secondary video stream; and
generating at least one video primitive relating to said at least one target.

33. The method according to claim 32, wherein said identifying at least one location comprises:
performing a template matching operation using information about at least one target.

34. The method according to claim 33, wherein said applying the at least one secondary video stream to a second vision module further comprises detecting at least one image feature in said at least one secondary video stream; and
wherein said performing the template matching operation uses the at least one image feature.

35. The method according to claim 33, wherein said performing the template matching operation uses at least one stored target model.

36. The method according to claim 35, wherein said performing the template matching operation further comprises providing information to update said at least one stored target model.

37. The method according to claim 22, wherein said automatically extracting comprises:
extracting a best-shot video stream including one or more targets of interest.

38. The method according to claim 22, wherein said automatically extracting comprises:
receiving configuration information to be used in determining how to extract at least one secondary video stream.

39. The method according to claim 22, wherein said automatically extracting comprises:
operating on a down-sampled version of the primary video stream to extract a secondary video stream from the plurality of secondary video streams, wherein the secondary video stream is selected from the group consisting of:
a secondary video stream extracted from the primary video stream; and
a secondary video stream extracted from the down-sampled version of the primary video stream.

40. An apparatus to automatically generate a plurality of secondary video streams based on an incoming primary video stream, comprising:
a first video analytics module executed by one or more hardware processors, the first video analytics module operating on the primary video stream to:
generate one or more first analysis results, the one or more first analysis results including information relating to at least one element selected from the group consisting of an event and an area of interest, wherein the first analysis results are generated using a first inference module with one or more user customizable rules, and
detect one or more events in the primary video stream based on the one or more first analysis results, wherein the one or more events refers to one or more objects engaged in an activity;
a video extraction module, executed by the one or more hardware processors, the video extraction module automatically generating the plurality of secondary video streams from the primary video stream based on the one or more first analysis results, wherein a field of view of one or more video streams in the plurality of secondary video streams is smaller than or equal to a field of view of the primary video stream; and
a second video analytics module, executed by one or more hardware processors, the second video analytics module operating on said plurality of secondary video streams to provide one or more second analysis results and to feed back said one or more second analysis results to the video extraction module;
wherein extraction of the plurality of secondary video streams by the video extraction module is further based on said one or more second analysis results.

41. The apparatus according to claim 40, wherein said first video analytics module comprises:
a first vision module, wherein the first inference module receives results from said first vision module.

42. The apparatus according to claim 41, wherein said first vision module comprises:
a first segmentation module;
a blobizer; and
a first primitive generation module.

43. The apparatus according to claim 42, wherein said first vision module further comprises:
a target tracking module; and
a target classification module.

44. The apparatus according to claim 40, wherein said second video analytics module comprises:
a second vision module; and
a second inference module to receive results from said second vision module.

45. The apparatus according to claim 44, wherein said second vision module comprises:
a scene motion estimation module to estimate scene motion in at least one secondary video stream;
a camera motion compensation module to operate on said at least one secondary video stream to produce at least one compensated secondary video stream;
a second segmentation module to identify at least one foreground portion in at least one compensated secondary video stream;
a target identification module to determine a location of at least one target in at least one compensated secondary video stream based on said at least one foreground portion; and
a second primitive generation module to generate one or more video primitives.

46. The apparatus according to claim 45, wherein said target identification module comprises:
a template matching module.

47. The apparatus according to claim 46, wherein said second vision module further comprises:
an image feature detection module to detect at least one image feature from said at least one secondary video stream and to provide said at least one image feature to said template matching module.

48. The apparatus according to claim 46, wherein said second vision module further comprises:

a storage device to store at least one target model, wherein said storage device is coupled to said template matching module to communicate therewith regarding said at least one target model.

49. The apparatus according to claim 40, wherein at least one of said modules comprises at least one device to implement at least a portion of the functionality of said at least one of said modules, said device selected from the group consisting of: a special-purpose hardware device and a programmable hardware device.

50. A method of automatically generating a plurality of secondary video streams based on an incoming primary video stream, comprising:
automatically extracting the plurality of secondary video streams from the primary video stream by one or more hardware processors, wherein a field of view of one or more video streams from the plurality of secondary video streams is smaller than or equal to a field of view of the primary video stream;
performing video analytics on said plurality of secondary video streams by the one or more hardware processors to provide one or more analysis results, the one or more analysis results including information relating to at least one element selected from the group consisting of an event and an area of interest, wherein the analysis results are generated using an inference module with one or more user customizable rules;
detecting, by the one or more hardware processors, one or more events in the primary video stream based on the one or more analysis results, wherein the one or more events refers to one or more objects engaged in an activity; and
feeding back, by the one or more hardware processors, said one or more analysis results such that said automatically extracting the plurality of secondary video streams is based at least in part on said one or more analysis results.

51. The method according to claim 50, wherein said automatically extracting comprises:
initially automatically extracting the plurality of secondary video streams from the primary video stream based on a predefined scheme for generating one or more secondary video streams.

52. The method according to claim 51, wherein said initially automatically extracting comprises a technique selected from the group consisting of:
generating one or more secondary video streams from the plurality of secondary video streams corresponding to predefined areas within the primary video stream; and
generating at least one secondary video stream that is scanned across at least part of the area within the primary video stream.

53. The method according to claim 50, wherein said performing video analytics on said plurality of secondary video streams comprises:
applying at least one secondary video stream to a vision module; and
applying results obtained from said vision module to the inference module.

54. The method according to claim 53, wherein said applying the at least one secondary video stream to the vision module comprises:
estimating scene motion in said at least one secondary video stream;
performing camera motion compensation on the at least one secondary video stream to provide at least one compensated secondary video stream;
identifying one or more foreground portions of said at least one compensated secondary video stream;
identifying at least one location of at least one target in said at least one compensated secondary video stream; and
generating at least one video primitive relating to said at least one target.

55. The method according to claim 54, wherein said identifying at least one location comprises:
performing a template matching operation using information about at least one target.

56. The method according to claim 55, wherein said applying the at least one secondary video stream to the vision module further comprises detecting at least one image feature in said at least one secondary video stream; and
wherein said performing the template matching operation uses the at least one image feature.

57. The method according to claim 55, wherein said performing the template matching operation uses at least one stored target model.

58. The method according to claim 57, wherein said performing the template matching operation further comprises providing information to update said at least one stored target model.

59. The method according to claim 50, wherein said automatically extracting comprises:
extracting a best-shot video stream including one or more targets of interest.

60. The method according to claim 50, wherein said automatically extracting comprises:
receiving configuration information to be used in determining how to extract the plurality of secondary video streams.

61. The method according to claim 50, wherein said automatically extracting comprises:
operating on a down-sampled version of the primary video stream to extract a secondary video stream from the plurality of secondary video streams, wherein the secondary video stream is selected from the group consisting of:
a secondary video stream extracted from the primary video stream; and
a secondary video stream extracted from the down-sampled version of the primary video stream.

62. An apparatus to automatically generate a plurality of secondary video streams based on an incoming primary video stream, comprising:
a video extraction module executed by one or more hardware processors, the video extraction module automatically generating the plurality of secondary video streams from the primary video stream, wherein a field of view of at least one secondary video stream of the plurality of secondary video streams is smaller than or equal to a field of view of the primary video stream; and
a video analytics module executed by one or more hardware processors, the video analytics module operating on said at least one secondary video stream to:
provide one or more analysis results and to feed back said one or more analysis results to the video extraction module, the one or more analysis results including information relating to at least one element selected from the group consisting of an event and an area of interest, wherein the one or more analysis results are generated using an inference engine with one or more user customizable rules, and detect one or more events in the primary video stream based on the one or more analysis results, wherein the one or more events refers to one or more objects engaged in an activity;
wherein extraction of the plurality of secondary video streams by the video extraction module is further based on said one or more analysis results.

63. The method according to claim 62, wherein said video analytics module comprises:
a vision module, wherein the inference module receives results from said vision module.

64. The apparatus according to claim 63, wherein said vision module comprises:
a scene motion estimation module to estimate scene motion in said at least one secondary video stream;
a camera motion compensation module to operate on said at least one secondary video stream to produce at least one compensated secondary video stream;
a segmentation module to identify at least one foreground portion in at least one compensated secondary video stream;
a target identification module to determine a location of at least one target in at least one compensated secondary video stream based on said at least one foreground portion; and
a primitive generation module to generate one or more video primitives.

65. The apparatus according to claim 64, wherein said target identification module comprises:
a template matching module.

66. The apparatus according to claim 65, wherein said vision module further comprises:
an image feature detection module to detect at least one image feature from said at least one secondary video stream and to provide said at least one image feature to said template matching module.

67. The apparatus according to claim 65, wherein said vision module further comprises:
a storage device to store at least one target model, wherein said storage device is coupled to said template matching module to communicate therewith regarding said at least one target model.

68. The apparatus according to claim 62, wherein at least one of said modules comprises at least one device to implement at least a portion of the functionality of said at least one of said modules, said device selected from the group consisting of: a special-purpose hardware device and a programmable hardware device.

69. At least one non-transitory computer-readable medium comprising instructions that, when executed by a computer, causes the computer to perform operations for automatically generating a plurality of secondary video streams based on an incoming primary video stream, the at least one computer-readable medium comprising instructions for:
performing video analytics on the primary video stream to generate one or more analysis results, the one or more analysis results including information relating to at least one element selected from the group consisting of an event and an area of interest, wherein the analysis results are generated using an inference engine with one or more user customizable rules;
detecting one or more events in the primary video stream based on the one or more analysis results, wherein the one or more events refers to one or more objects engaged in an activity; and
automatically extracting the plurality of secondary video streams from the primary video stream based on the one or more analysis results, wherein a field of view of one or more video streams in the plurality of secondary video streams is smaller or equal to than a field of view of the primary video stream.

70. At least one non-transitory computer-readable medium comprising instructions that, when executed by a computer, causes the computer to perform operations for automatically generating a plurality secondary video streams based on an incoming primary video stream, the at least one computer-readable medium comprising instructions for:
performing first video analytics on the primary video stream to generate one or more first analysis results, the one or more first analysis results including information relating to at least one element selected from the group consisting of an event and an area of interest, wherein the first analysis results are generated using an inference engine with one or more user customizable rules;
detecting one or more events in the primary video stream based on the one or more first analysis results, wherein the one or more events refers to one or more objects engaged in an activity;
automatically extracting the plurality of secondary video streams from the primary video stream based on the one or more first analysis results, wherein a field of view of a secondary video stream from the plurality of secondary video streams is smaller than or equal to a field of view of the primary video stream;
performing second video analytics on said plurality of secondary video streams to provide one or more second analysis results; and
feeding back said one or more second analysis results such that said automatically extracting the plurality of secondary video streams is further based on said one or more second analysis results.

71. At least one non-transitory computer-readable medium comprising instructions that, when executed by a computer, causes the computer to perform operations for automatically generating a plurality secondary video streams based on an incoming primary video stream, the at least one computer-readable medium comprising instructions for:
automatically extracting the plurality of secondary video streams from the primary video stream, wherein a field of view of one or more video streams from the plurality of secondary video streams is smaller than or equal to a field of view of the primary video stream;
performing video analytics on said plurality of secondary video streams to provide one or more analysis results, the one or more analysis results including information relating to at least one element selected from the group consisting of an event and an area of interest, wherein the analysis results are generated using an inference engine with one or more user customizable rules;
detecting one or more events in the primary video stream based on the one or more analysis results, wherein the one or more events refers to one or more objects engaged in an activity; and
feeding back said one or more analysis results such that said automatically extracting the plurality of secondary video streams is based at least in part on said one or more analysis results.

* * * * *